Feb. 9, 1932.  J. HERMAN  1,844,886
MEANS FOR MEASURING TIME OF PROPAGATION OF WAVE FRONTS OVER CIRCUITS
Filed Dec. 2, 1927
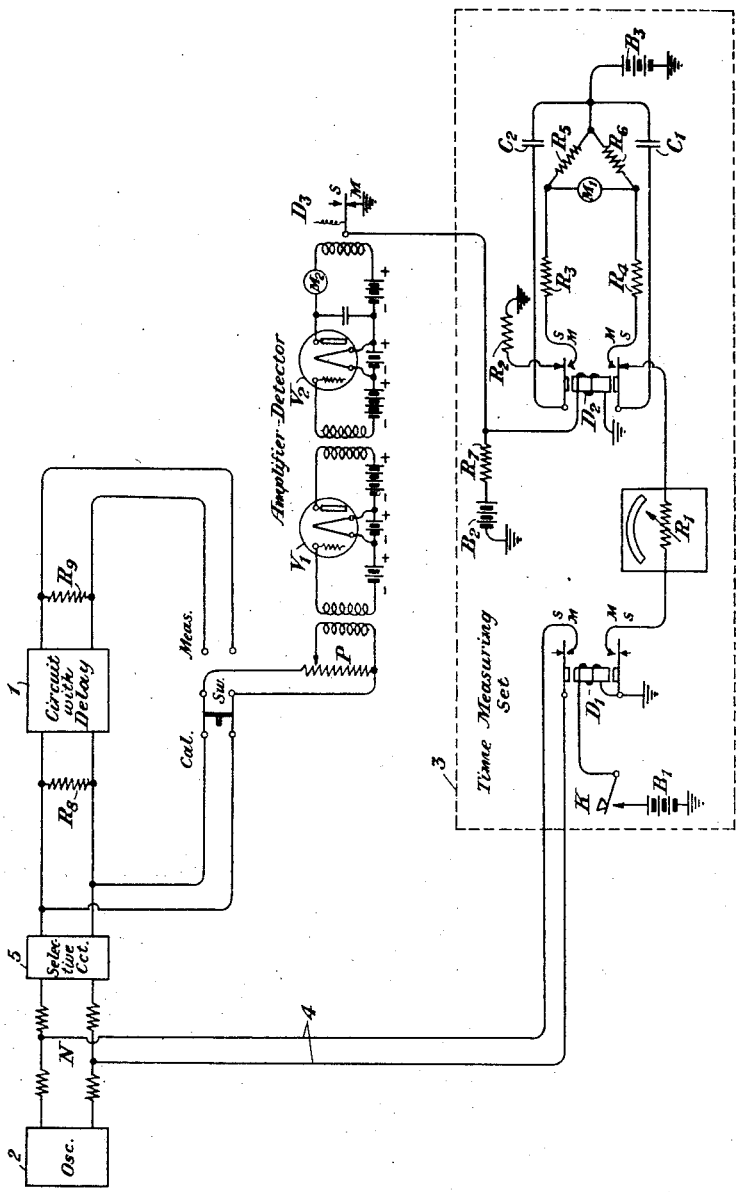
INVENTOR.
J. Herman
BY
ATTORNEY Patented Feb. 9, 1932

1,844,886

UNITED STATES PATENT OFFICE

JOSEPH HERMAN, OF WESTFIELD, NEW JERSEY, ASSIGNOR TO AMERICAN TELEPHONE AND TELEGRAPH COMPANY, A CORPORATION OF NEW YORK

MEANS FOR MEASURING TIME OF PROPAGATION OF WAVE FRONTS OVER CIRCUITS

Application filed December 2, 1927. Serial No. 237,300.

This invention relates to means for measuring the time of propagation of a wave front over a circuit with currents of various frequencies.

An instance wherein measurements of this character might be of value would be in the construction and design of new circuits, and more particularly with respect to the design of networks to be utilized in such circuits to equalize the time of propagation thereover of currents of different frequencies. Other uses and features of the invention will appear more fully from the detailed description hereinafter given.

The invention utilizes the measuring device disclosed in a copending application in the name of J. Herman, filed September 2, 1926, Serial No. 136,887 and which issued June 24, 1931, as Patent No. 1,765,585. In this device, the method of operation consists in charging a condenser during the interval of time to be measured, discharging this condenser through an indicating means, such as a differential meter, adjusting the electrical constants of the charging circuit of the condenser by means of a variable resistance, repeating the above operations until the charge accumulated on the condenser is equal to a known charge, and utilizing the values of the electrical constants of the charging circuit when the charge accumulated on the condenser is equal to a known charge to determine the interval of time to be measured. In the arrangements and method of the present invention, current of the frequency to be measured will be applied to, or cut off from, one end of a circuit utilized as a standard for calibration purposes as soon as the condenser in the measuring set starts charging. This current will operate a relay at the other end of the circuit. This relay will control means for discharging the condenser of the measuring set. The interval of time between application of the current and operation of the relay will represent the time of propagation of the wave front over the circuit. This interval of time will be the measurement given by the set. The current of frequency to be measured will then be applied to or cut off from a circuit having an unknown delay element therein and the interval between application of current thereto and operation of relay means at the other end will be measured by the measuring set. A comparison of the two interval measurements will afford an indication of the time of propagation of the wave front over the circuit with the unknown delay therein.

The invention may be more fully understood from the following description together with the accompanying drawing, in the figure of which is shown a circuit diagram illustrating a preferred form of the invention.

The arrangements shown in the drawing consist primarily of the circuit 1 whose delay is to be measured, an oscillator 2 for furnishing currents of different frequencies, an amplifier-detector and a time measuring set 3. The delay circuit 1 is terminated by resistances $R_8$ and $R_9$ whose ohmic values are equal to the characteristic impedance of the delay circuit. The input and output terminals of this circuit are connected, respectively, to the "calibrate" and "measure" positions of a double-pole-double-throw switch SW whose mid-terminals are connected to the input of the amplifier-detector. The output of oscillator 2 is connected through a resistance network N and a selective circuit 5 to the input of the delay circuit 1. At N the output circuit of the oscillator is bridged by the circuit 4 connected to one set of the contacts of the starting relay $D_1$ in the measuring set 3. By connecting the circuit 4 to the network N as shown, the network N prevents undue change of the input impedance of the filter 5 when the short-circuit 4 is closed. A change in the input impedance of the filter 5 might change its selective characteristics and permit harmonics to be transmitted. These contacts are arranged so that the output of the oscillator is short-circuited whenever relay $D_1$ is operated. The selective circuit 5 has a narrow band width and is used to suppress transients generated by the operation of the contacts of the starting relay $D_1$. The amplifier-detector consists of an input potentiometer P, an amplifier tube $V_1$ and a detector tube $V_2$. Into the output circuit of the detector tube are connected the milliammeter $M_2$ and the winding of relay $D_3$. The latter is arranged to operate to its $m$ contact whenever current from the oscillator 2 is applied to the input of the amplifier-detector. The time measuring set 3 comprises two relays $D_1$ and $D_2$, the key $K_1$, a differential meter arrangement comprising the meter $M_1$ and the resistances $R_5$ and $R_6$, two condensers $C_1$ and $C_2$ and several batteries and resistances. Its operation will be pointed out in more detail later on.

Before a measurement can be made, the following adjustments are necessary; the selective circuit 5, if used, should first be adjusted to the desired frequency, after which the oscillator should be adjusted to this same frequency and to the desired output current. With the key K open and switch SW on "calibrate", the potentiometer P of the amplifier-detector is adjusted to give a direct current reading on meter $M_2$ about twice that required to just operate relay $D_3$. This reading should be noted, since it will have to be duplicated when switch SW is on the "measure" position.

When these adjustments have been made, a calibration reading should be obtained. This calibration reading is the sum of the delay in the measuring set 3, the amplifier-detector and the selective circuit 5. It is obtained by repeatedly operating the key K and adjusting the resistance $R_1$ until meter $M_1$ shows no deflection. The value of resistance $R_1$ is then a direct measure of this delay, and its value in units of time is read directly on the scale associated with $R_1$. Having obtained this calibration reading of the set-up, the switch SW is thrown to the "measure" position. The potentiometer P is then readjusted to give the same reading on the detector meter $M_2$ as before. The key K is operated repeatedly, and the resistance $R_1$ is adjusted until a balance is again obtained on the meter $M_1$. The time corresponding to this set-up, as read from the scale of $R_1$, consists of the calibration reading obtained above plus the delay in circuit 1. By subtracting the two values, the delay in circuit 1 is obtained for the particular frequency to which the oscillator was adjusted. For the delay at other frequencies, the above procedure must be repeated.

In order to more fully understand the process by which the time measurement of the delay is made, a detailed description of the operation of the various circuit elements will now be given. When the key K is open, as shown in the drawing, current from the oscillator 2 flows through the selective circuit 5 and a small part of the current at the input of circuit 1 flows through the high impedance potentiometer P, is amplified at $V_1$ and detected at $V_2$, thereby causing the armature of relay $D_3$ to rest on its $m$ contact and short-circuit the winding of relay $D_2$. When key K is closed, relay $D_1$ is operated, causing the output of oscillator 2 to be short-circuited and at the same time closing the charging circuit of condenser $C_1$ through the resistance $R_1$ and battery $B_3$. This condenser continues to charge until the detector relay $D_3$ operates, allowing $D_2$ to operate and open the charging circuit. The partially charged condenser $C_1$ and the fully charged condenser $C_2$ are then connected differentially to meter $M_1$. If the two charges are equal, no deflection of the meter will occur. If they are unequal, deflection will be observed. By repeatedly opening and closing the key K and readjusting the resistance $R_1$, the two charges can be made equal and the elapsed time between the operation of $D_1$ and of $D_2$ is then indicated by the value of $R_1$. This elapsed time, as previously mentioned, consists of the zero error of the measuring arrangement. When the measurment is made to the output instead of to the input of the delay circuit 1, the elapsed time consists of the zero error plus the delay of circuit 1. By subtracting the results of the two measurements, the value of the delay in circuit 1 is readily obtained.

While the invention has been disclosed as embodied in certain specific arrangements which are deemed desirable, it is understood that it is capable of embodiment in many and other widely varied forms without departing from the spirit of the invention as defined by the appended claims.

What is claimed is:

1. The combination of a time measuring set whereby a direct indication may be given of the time interval between the control of a current source associated with one end of a circuit and the operation of responsive means at the other end of said circuit, with a line having a delay circuit therein to be measured, means to apply a source of alternating current waves to one end of said line, a responsive means adapted to be connected to the other end of said line, switching means whereby said line may be completed with or without the inclusion therein of said delay circuit, means for starting the operation of said measuring set, means for simultaneously controlling the transmission of current from said source to said line, means controlled by said responsive means for completing the operation of said measuring set, and means inserted in said line between said responsive means and said means for controlling transmission to prevent the transmission of transients due to the operation of said transmission controlling means.

2. The combination of a time measuring set whereby a direct indication may be given of the time interval between the control of a current source associated with one end of a circuit and the operation of responsive means at the other end of said circuit, with a line having a delay circuit therein to be measured, means to apply a source of alternating current waves to one end of said line, a responsive means adapted to be connected to the other end of said line, switching means whereby said line may be completed with or without the inclusion therein of said delay circuit, means for starting the operation of said measuring set, means for simultaneously controlling the transmission of current from said source to said line, means controlled by said responsive means for completing the operation of said measuring set, a filter inserted in said line between said responsive means and said means for controlling transmission, said filter suppressing transients due to the operation of said transmission controlling means, and means associated with the input side of said filter to prevent substantial change in the input impedance of the filter when said transmission controlling means is operated.

In testimony whereof, I have signed my name to this specification this 1st day of December, 1927.

JOSEPH HERMAN.